March 15, 1932.   R. E. JENKINSON   1,849,625
METHOD OF CONSTRUCTING PNEUMATIC TIRES
Filed March 5, 1928
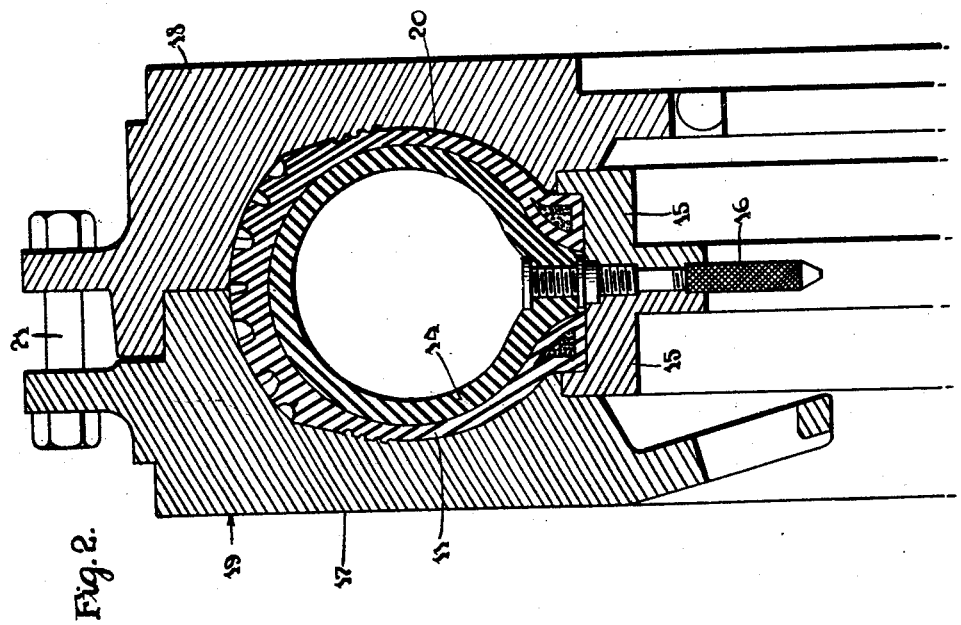
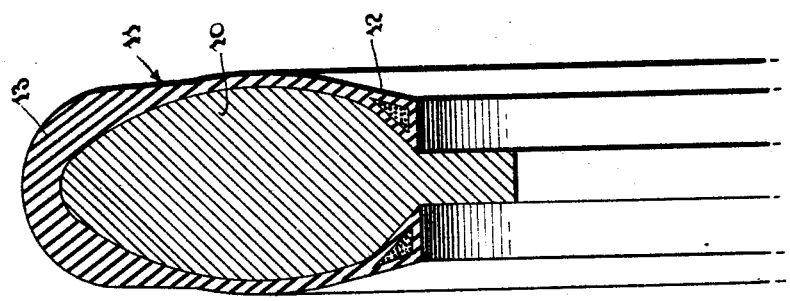
Inventor
Ross E. Jenkinson.
By
Attorney Patented Mar. 15, 1932

1,849,625

UNITED STATES PATENT OFFICE

ROSS E. JENKINSON, OF AKRON, OHIO, ASSIGNOR TO THE GOODYEAR TIRE & RUBBER COMPANY, OF AKRON, OHIO, A CORPORATION OF OHIO

METHOD OF CONSTRUCTING PNEUMATIC TIRES

Application filed March 5, 1928. Serial No. 259,056.

The invention relates generally to a method of construction inflatable articles and has particular relation to a method of the above designated character for constructing pneumatic tire casings for motor vehicles and the like.

One object of the invention is to provide a method of making a pneumatic tire casing which comprises a greater amount or quantity of ply material than has heretofore been employed in such casings.

Another object of the invention is to provide a method of making a pneumatic tire casing embodying a greater number of cords per inch of ply material than has been employed heretofore in constructing such casings.

By a known method of constructing pneumatic tire casings employed prior to this invention, a plurality of plies of cord fabric material have been superposed or assembled upon a core having a cross-sectional configuration substantially identical to that of a finished pneumatic tire casing. During the application of the ply material a slight separation of the cords occurred along the central portion of each ply adjacent the portion of the core having the greatest circumference. Thereafter, when the tire was cured in a mold having substantially the same cross-sectional configuration as the core, the cords were permanently secured in this relation. Consequently, the plies of fabric material in the finished tire contained a less number of cords per inch around the outer periphery of the tire than was embodied in the fabric material employed in constructing the tire.

In the method embodying this invention, a tire is constructed on a substantially peaked or elliptical core and thus the ply material, when applied to the outer circumference of the core, occupies a position more remote from the center of the tire than such material occupies during the construction of a tire on a circular core. Although the cords are separated slightly during the application of the ply material to the core, they are compressed more closely together when the tire later is inflated by an airbag and cured in a substantially circular mold. Although the bead portions of the tire retain their original dimensions during the molding operation, the outer circumference thereof is reduced in diameter and consequently the cords are compressed more closely together.

For a better understanding of the invention, reference may now be had to the accompanying drawings, forming a part of this specification, in which:

Fig. 1 is a fragmentary cross-sectional view of a pneumatic tire casing constructed according to one embodiment of the invention; and Fig. 2 is a fragmentary cross-sectional view of a circular mold in which the tire casing illustrated in Fig. 1 is being cured.

In Fig. 1, an annular peaked core 10, constructed of any suitable material, is shown, having generally an elliptical cross-sectional configuration, in which the major axis of the ellipse is co-extensive with the median plane of the tire. The core 10 is of the segmental collapsible type and is rotatably mounted at its axis on a tire machine (not shown) which embodies the usual auxiliary devices employed in constructing a pneumatic tire casing. A pneumatic tire casing 11, having beads 12 and a tread 13, is assembled in the usual manner upon the core 10. The latter subsequently is removed from the casing by collapsing its segments, and an airbag 14 is disposed therein.

Oppositely disposed rims 15 are clamped on the beads 12 of the casing and the airbag 14 is inflated by the application of an air hose (not shown) to the valve stem 16 thereof. Complemental sections 17 and 18 of a mold 19, having a cavity 20 substantially circular in cross-section, are clamped by bolts 21 about the outer surface of the casing 11 and the entire unit is placed in a vulcanizing heater (not shown) where the material composing the casing 11 is cured. The maximum diameter of the cavity of the mold 19 is substantially less than the maximum diameter of the tire casing 11 after its construction upon the core 10.

From the foregoing description, it is apparent that a tire casing constructed according to the principles of the invention embodies an unusually large amount of fabric material as compared with pneumatic tire casings constructed according to other known methods. Manifestly, a greater concentration of cords around the outer tread portion of a tire, increases the strength of the latter without increasing the number of plies employed in its construction.

Although I have illustrated but the preferred form which my invention may assume and have described that form in detail, it will be apparent to those skilled in the art that the invention is not so limited but that various modifications may be made therein without departing from the spirit of the invention or from the scope of the appended claims.

What I claim is:

1. A method of building tires which comprises assembling the elements of a tire into a form of materially greater maximum diameter than the maximum diameter of the finished tire, shaping the tire to reduce materially the maximum diameter first mentioned, and thereafter curing the shaped tire.

2. A method of building tires which comprises assembling the elements of a tire on a core having a circumference greater than that of the finished tire and vulcanizing the assembled unit in a mold of circular cross-section having a circumference substantially less than that of the core.

3. A method of building tires which comprises assembling the elements of a tire on an elliptical cross-sectional core having a circumference greater than that of the finished tire removing the assembled unit from the core, inserting an airbag therein and vulcanizing the assembled unit in a mold of circular cross-section having a circumference substantially less than that of the core.

4. A method of building tires which comprises assembling the elements of a tire on an elliptical cross-sectional core removing the assembled unit from the core, inserting an airbag therein and vulcanizing the assembled unit in a mold of circular cross-section having a circumference substantially less than that of the assembled unit while the tread and side-wall portions are maintained in substantially a contracted state.

5. A method of building tires which comprises assembling the elements of a tire in an unvulcanized carcass which is elliptical in cross-section and thereafter vulcanizing the carcass while maintaining the carcass in such a position that it is circular in cross section and of a smaller outer circumference than when built in the elliptical section.

In witness whereof, I have hereunto signed my name in the presence of two subscribing witnesses.

Signed at Akron, in the county of Summit and State of Ohio, U. S. A., this 3rd day of March, 1928.

ROSS E. JENKINSON.